Figure 5:
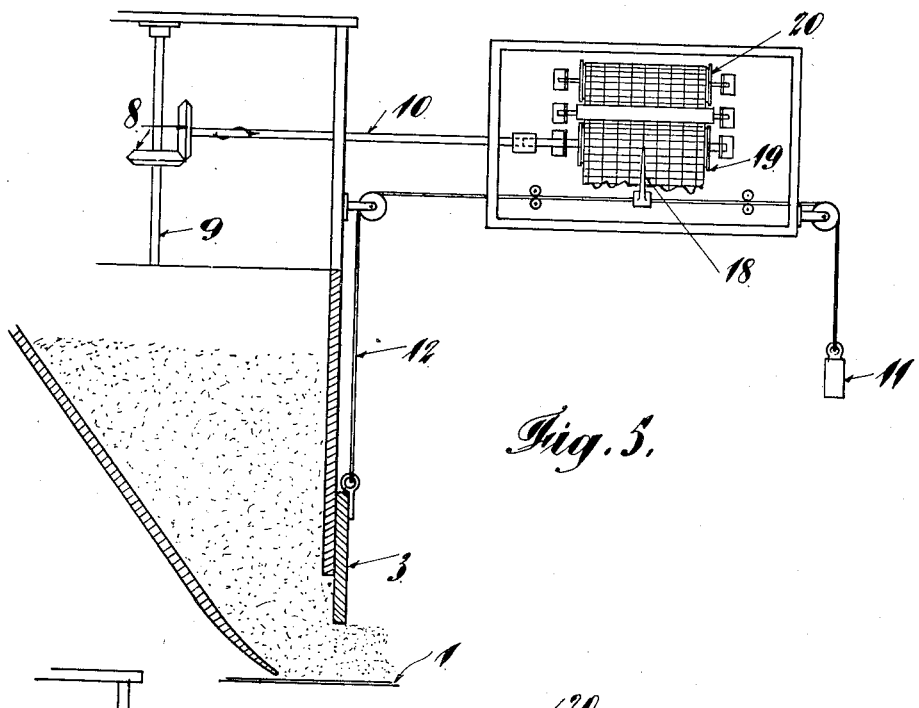

J. E. LEA.
APPARATUS FOR MEASURING GRANULAR OR POWDERED MATERIALS.
APPLICATION FILED APR. 22, 1915.
1,151,956.
Patented Aug. 31, 1915.
5 SHEETS—SHEET 1.
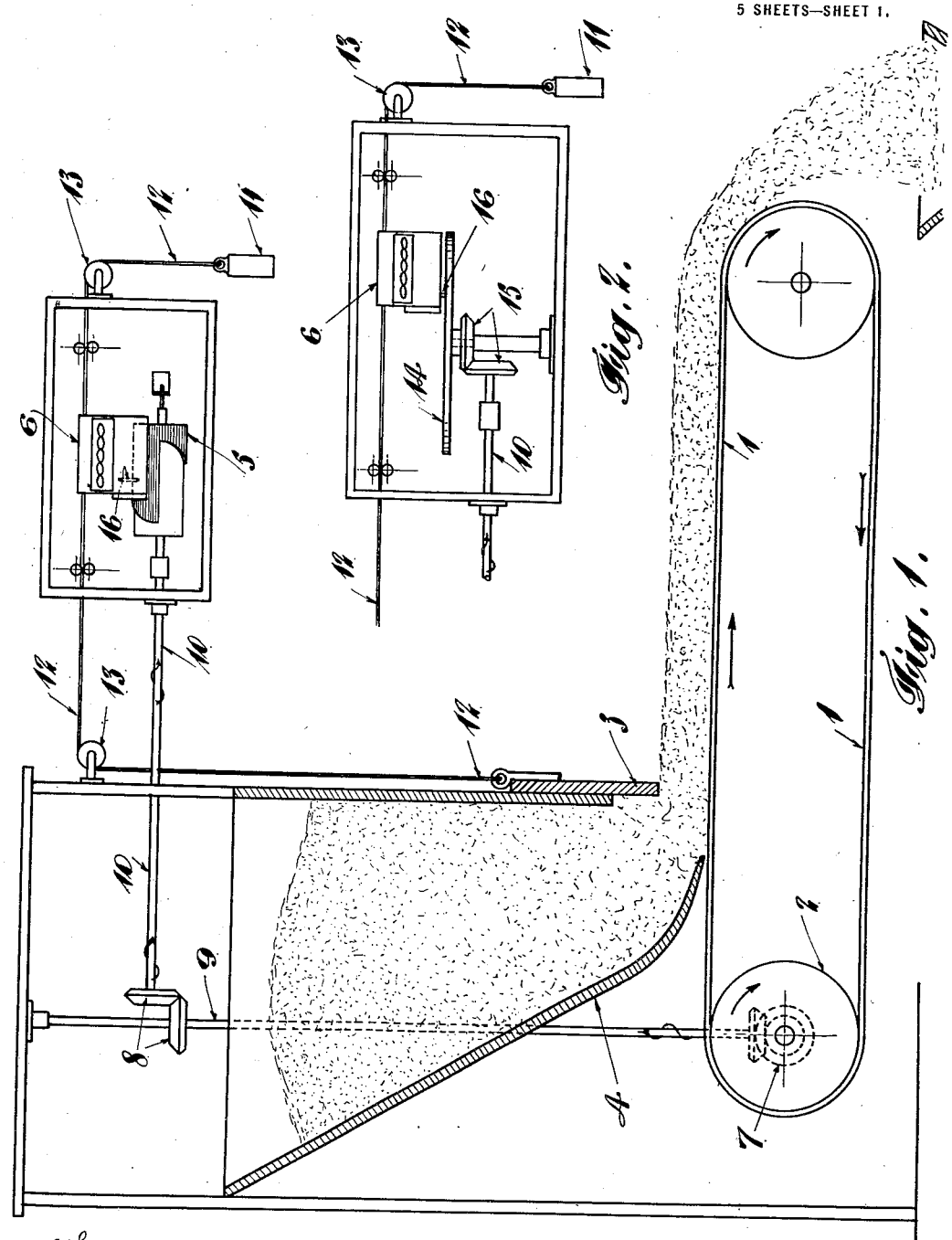

J. E. LEA.
APPARATUS FOR MEASURING GRANULAR OR POWDERED MATERIALS.
APPLICATION FILED APR. 22, 1915.

1,151,956.

Patented Aug. 31, 1915.
5 SHEETS—SHEET 3.

Witnesses
John C. Sanders.
Albert F. Heuman.

Inventor.
James Edward Lea
By his Attorney. W. Wallace White

J. E. LEA.
APPARATUS FOR MEASURING GRANULAR OR POWDERED MATERIALS.
APPLICATION FILED APR. 22, 1915.

1,151,956.

Patented Aug. 31, 1915.
5 SHEETS—SHEET 5.

Witnesses:-
John C. Sanders
Albert F. Heuman

Inventor:-
James Edward Lea
By his Attorney:- Wm Wallace White

UNITED STATES PATENT OFFICE.

JAMES EDWARD LEA, OF MANCHESTER, ENGLAND.

APPARATUS FOR MEASURING GRANULAR OR POWDERED MATERIALS.

1,151,956. Specification of Letters Patent. Patented Aug. 31, 1915.

Application filed April 22, 1915. Serial No. 23,171.

*To all whom it may concern:*

Be it known that I, JAMES EDWARD LEA, a subject of the King of Great Britain and Ireland, and resident of Manchester, England, have invented certain new and useful Improvements in and Relating to Apparatus for Measuring Granular or Powdered Materials, of which the following is a specification.

This invention refers to and consists of a new or improved arrangement and combination of mechanism for automatically effecting the volumetric measurement of substances or materials in granular or powdered form.

The invention relates, in particular, to the volumetric measurement of such substances or materials delivered through an orifice or opening under the control of a "regulator" and while being carried forward or transported by a "conveyer" or "distributer."

One of the uses of the invention will be in the volumetric measurement of fuel fed into a furnace by a mechanical stoker, while another use will be in the like measurement of grain delivered from a chute or hopper on to an endless conveyer.

Other uses of the invention will be in the volumetric measurement of materials such as salt, flour, sand, stone and the like.

The object of the invention is to effect the desired measurement automatically by means of an integrating measuring instrument which is actuated in sympathy with the movements of the said "conveyer" or "distributer" and subject to the control of the "regulator", the measurement being indicated either numerically or graphically, or both. From the figures or record thus produced, various useful data may be obtained or derived. For example, in the case of fuel fed into a furnace, the figures or record, in conjunction with a water meter, or steam meter, will enable the evaporative values of different fuels or grades of fuel, or the heat efficiency of the boiler to be determined. The graphic measurement will also show the thickness of the layer during any given delivery of the fuel. In the case of grain and the like, the numerically indicated measurement will show the total quantity delivered, while the graphic record will enable the total quantity of a given delivery, or a succession of deliveries to be readily computed. It will also show the thickness of the layer of grain during such delivery or deliveries.

In the conveyance or transmission of granular materials one or other of two methods is usually adopted, (1) by means which transport the material continuously, and (2) by means which transport the material intermittently, this last named method being used in certain types of mechanical stokers.

The present invention has for its object to measure the materials while being conveyed or transmitted by either of the said methods.

For producing the numerically indicated measurement, the instrument will preferably be similar to the integrating instrument forming the subject of Letters Patent No. 1112459, or the integrating instrument forming the subject of British Patent No. 9723 of 1909.

Figure 3:
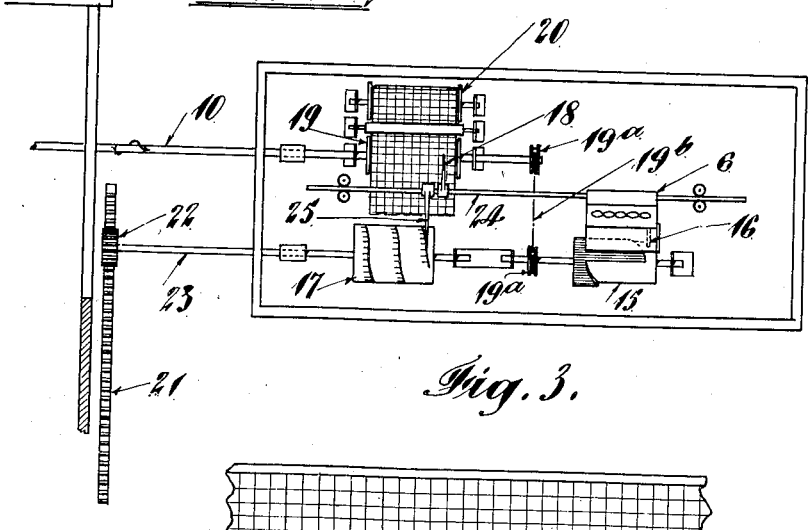
Figure 4:
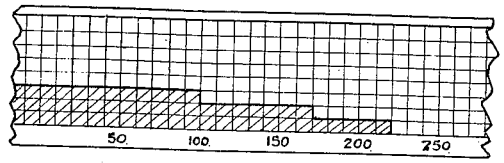
Figure 6:
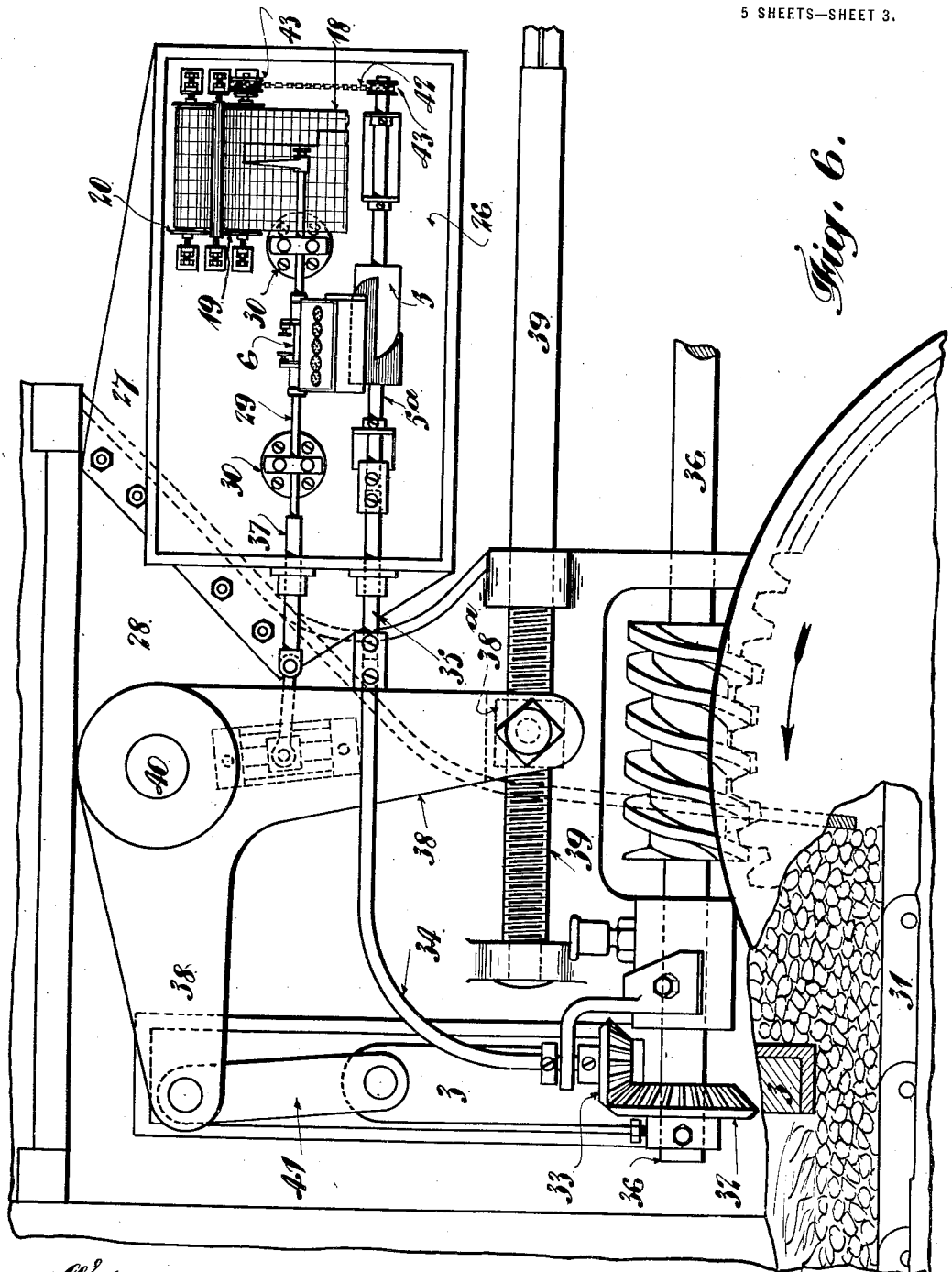
Figure 4:
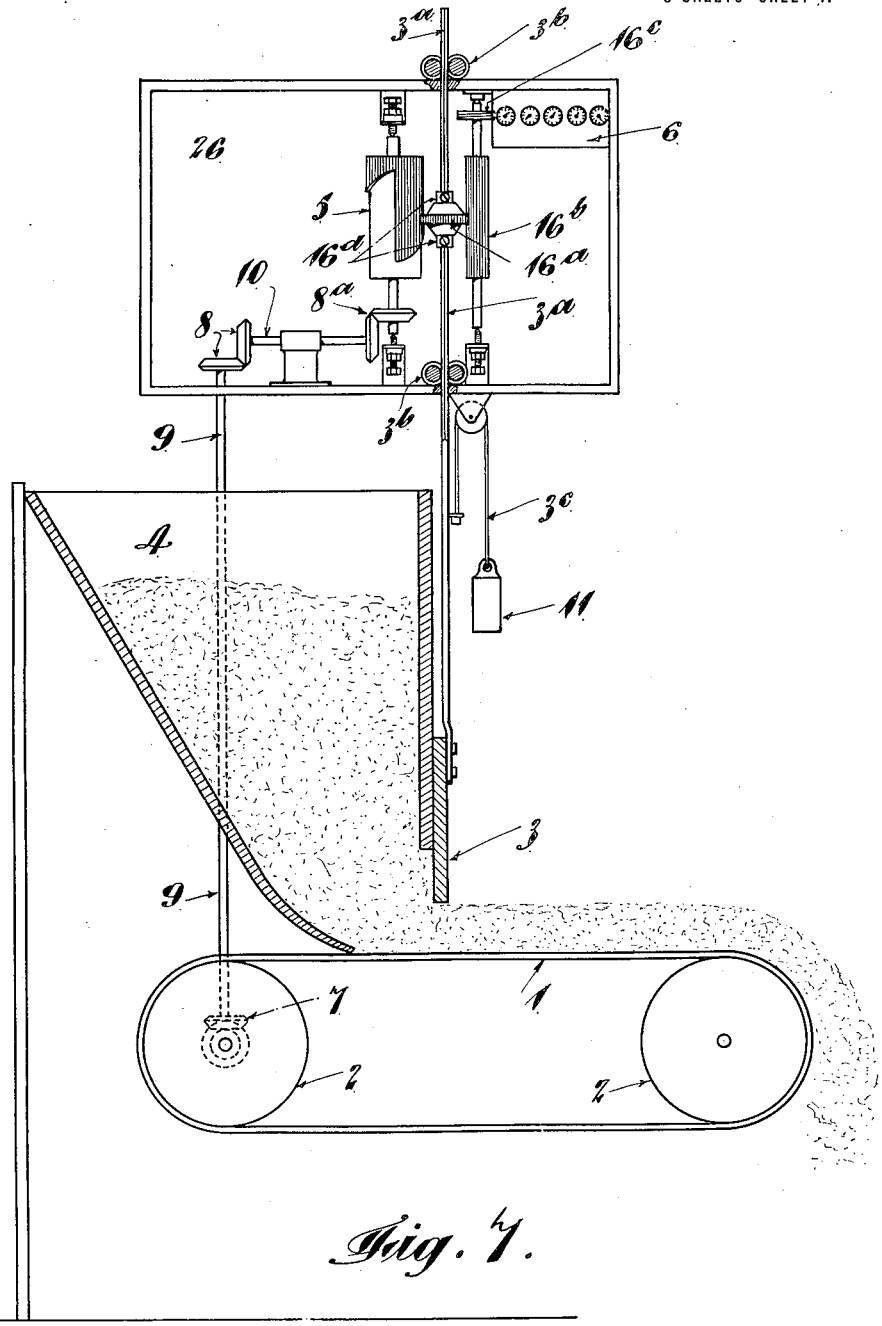
Figure 8:
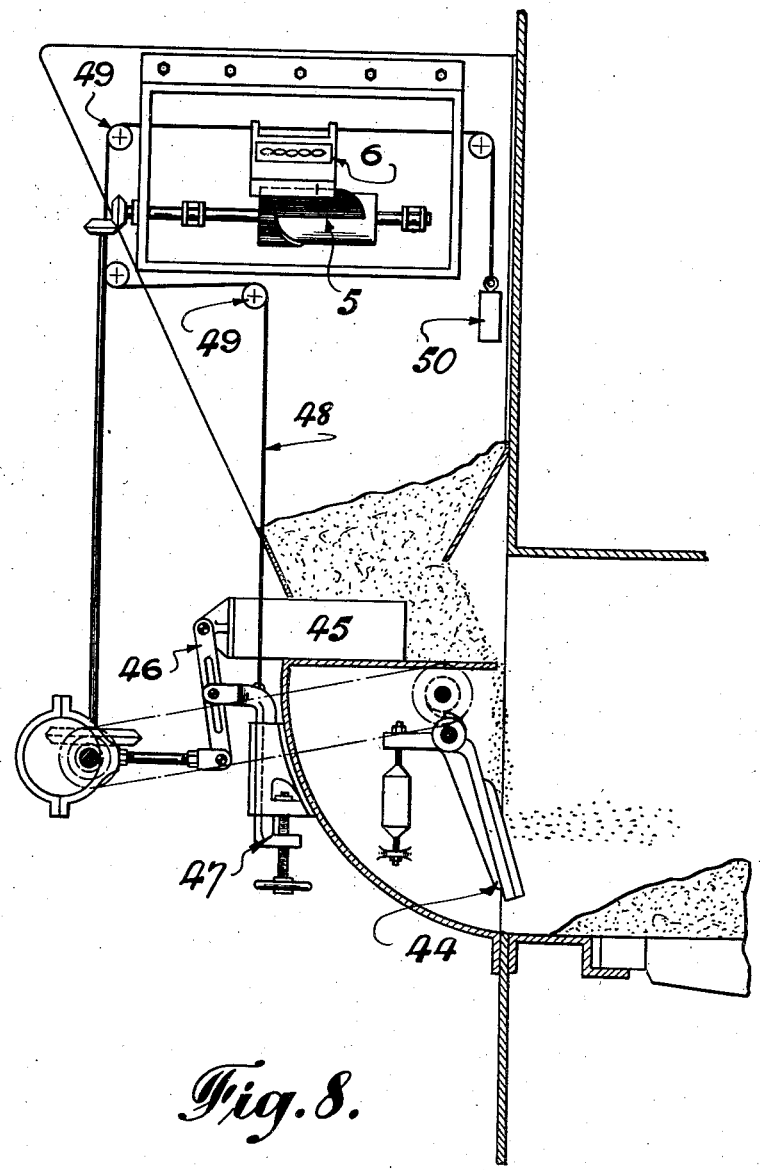

Upon the accompanying drawings, Figure 1 illustrates, in diagram, the application of the invention to apparatus in which the propulsion of the material to be measured is of a continuous character. Fig. 2 illustrates, in diagram, a modification of a detail part. Fig. 3 illustrates, in diagram, the measuring instrument as adapted to produce a graphic record, or both the graphic record and the numerical indication, and also as adapted to afford a rectifying motion should the variations in the effective cross-sectional areas of the fuel or other layer be other than directly proportional to the movements of the regulator, and (or) to afford between the regulator and counter a motion-reducing action when the vertical movements of the regulator are large, or a motion-multiplying action when such vertical movements are small. Fig. 4 illustrates an example of a graphic record produced by the arrangement shown in Fig. 3. Fig. 5 illustrates, in diagram, a modification of Fig. 3. Fig. 6 illustrates an example of the practical application of the invention to a mechanical stoker of the chain-grate type. Fig. 7 illustrates, in diagram, a further modification hereinafter described. Fig. 8 illustrates, in diagram, the application of the invention to apparatus in which the propulsion of the material to be measured is of an intermittent character.

In the following description, the term "conveyer" or "distributer" is intended to stand for an endless belt or chain, or a shovel or other device designed to convey or transport the material to be measured from one point to another, while the term "regulator" will stand for any form of device for controlling the thickness or cross sectional area of the fuel or other layer to be measured.

Referring to Fig. 1, the "conveyer" thereon shown is represented as an endless band 1 passing around pulleys 2, 2, while the "regulator" is represented as a door 3, this latter being mounted to slide vertically and to control the thickness of the granular or powdered material flowing from the hopper 4 on to the band 1.

The measuring instrument shown comprises the integrating drum 5 and a revolution counter 6, the former being driven at a speed proportional to that of the conveyer, and the latter being moved endwise and in proportion to the vertical movements of the door 3. The drum 5 may, as shown, be driven by one of the pulleys of the conveyer through bevel wheels 7, 8 and shafts 9, 10, while the counter 6 may be moved endwise by the door 3 in one direction and by a counterbalance weight 11 in the opposite direction, the door and weight being connected to the counter by cords 12 working over pulleys 13.

With the lower edge of the regulator 3 parallel with the upper face of the conveyer, and with the sides of the hopper opening at right angles to the said face of the conveyer, the opening through which the material has to pass is rectangular. To measure the total quantity or cubic feet of material passing on to the conveyer it is therefore necessary to multiply the area of the said opening by the distance traversed by the material, that is to say, where $a=$ area of opening in square feet and $d=$ distance in feet traversed by the conveyer, the total quantity of material delivered by the conveyer $=a \times d=q$ cubic feet.

For the purpose of affording the desired measurement mechanically, the integrating drum 5 of the instrument is driven at a speed proportional to that of the band or conveyer 1 and the "curve" or contour of the toothed portion of the drum is plotted to correspond with the varying areas of the said opening. Should the hopper opening be rectangular, the said "curve" of the drum will be a regular helix, but should the hopper opening not be rectangular, and consequently the variation in area not be strictly proportional to the lift of the door, the "curve" or contour of the toothed portion of the drum 5 would not be a regular helix but would be an irregular helix, as in the case of the toothed integrating drum described in the said prior Patent No. 1112459.

The counter 6 is moved endwise to an extent proportional to the vertical movements of the door 3. Under these circumstances, therefore, and with the conveyer 1 in motion, the door 3 raised, and material passing from the hopper on to the conveyer, the counter 6 will automatically count up the total quantity or cubic feet of material that has passed through the hopper opening and has been transported by the conveyer. With the width of hopper opening constant, the integration will only require to be in respect to the thickness or cross sectional area of the fuel or other layer, and the distance traveled by the conveyer.

When the door 3 is at its lowest position and no material is passing, even although the conveyer may still be in motion, or alternatively, when the door 3 is fully open and the conveyer is stopped, no motion will be imparted to the wheels of the counter, while under all other intermediate conditions as to the area of the hopper opening and the speed of the conveyer, the motion of the wheels of the counter will be proportional to the amount of material delivered on to the conveyer.

In lieu of using the toothed integrating drum 5, a friction integrating disk 14 may be used, see Fig. 2, the disk being rotated in sympathy with the conveyer through say bevel wheels 15 and shaft 10. The driving wheel 16 of the counter 6 will rest upon the face of the disk, and, with the endwise movements of the counter, will slide over the top face of the disk and take up various positions according to the degree, or area of the hopper opening, the wheel lying over the center of the disk when the door is closed and near to the periphery of the disk when the door is fully opened.

When it is required to give a graphic record, instead of the numerical indication, the instrument may comprise a drum 17, see Fig. 3, similar to the motion-rectifying drum described in the specification of Patent 815102. It may also comprise a pen-carrying arm 18, and a chart-carrying drum 19, the chart paper being in the form of a roll of paper carried upon a roller 20, the drum being provided with pins engaging holes in the edges of the paper. The chart paper will be ruled with longitudinal lines representing various heights of the door, or (and) various areas of hopper opening, and with transverse lines representing divisions of lineal measurement.

The drum 19 will be driven by shaft 10 at a speed proportional to that of the conveyer, while the drum 17 will be rotated by a rack 21 connected to the door 3, and by a pinion 22 on the drum shaft 23. The pen-carrying arm 18 will be carried by a sliding rod 24 and upon such rod will be the arm 25 lying tangential to the drum 17, and, at its free extremity, engaging the usual spiral groove or ridge in or on the drum 17. Such spiral groove or ridge will be a regular or irregular helix according as the variations in the area of the hopper opening are directly proportional to the movement of the door or otherwise. When the hopper door is opened, the drum 17 will be rotated and caused to move the pen a distance proportional to the movement of the door or otherwise. When the hopper door is opened, the drum 17 will be rotated and caused to move the pen a distance proportional to the area of the hopper opening, while with the conveyer and drum 19 set in motion, the pen will mark upon the chart paper a line representing the thickness, or cross-sectional area of the layer of material, and the distance traversed by such material. An example of a graphic record thus obtained is shown in Fig. 4, the heavy line indicating that the layer of material was 3 inches thick for 100 feet of traverse, 2 inches thick for 70 feet of traverse, and 1 inch thick for 50 feet of traverse. Or, assuming the hopper opening is 2 feet wide and the door raised 3 inches, thus giving an area of 0.5 square feet, the graphic record will show that in the first 100 feet of traverse 50 cubic feet of material were delivered; with the door lowered to 2 inches thus giving an area of 0.333 of a square foot, the graphic record will show that in the next 70 feet of traverse 23.31 cubic feet of material were delivered, while with the door lowered to 1 inch, thus giving an area of 0.16 square feet, the graphic record will show that in the next 50 feet of traverse 8.33 cubic feet of material were delivered. From the diagram thus produced, the area of which represents the total cubic feet of material delivered, the total quantity may be readily computed with the aid of a planimeter.

When both a numerical indication and a graphic record are required the instrument will also comprise the integrating drum 5 and the counter 6, this latter being mounted upon and moving endwise with the rod 24, while the drum 5 is rotated from the drum 19 by pulleys 19$^a$ and endless chain 19$^b$. When the area of the hopper openings are not directly proportional to the lift of the door, the drum 17, while being used for moving the pen and counter endwise, may also serve to rectify the endwise motion of the pen and counter to suit the variations in the said areas of opening, the curve of the drum 5 then being a regular helix. When the variations in the areas of the hopper opening are directly proportional, the drum 17, besides serving to move the pen and counter endwise, may also serve to multiply or reduce such movements of the pen and counter relatively to those of the door 3, which may be large or small.

Should the hopper opening be purely rectangular, the drum 17 may be dispensed with and the pen and counter moved directly by the door 3 and weight 11 in the same way as the counter is moved in Fig. 1. Similarly, when only a graphic record is required, the pen may be moved endwise by the direct action of the door 3 and weight 11, see Fig. 5.

Referring now to Fig. 6, which illustrates the invention applied to a mechanical stoker of the chain-grate type, the measuring instrument is mounted within a dust-proof casing 26, secured say by plate 27 to the fuel hopper 28. The counter 6 is mounted upon a rod 29 slidably mounted in bearings 30. As in the prior invention, the driving wheel of the counter is adapted to mesh with the teeth of the drum 5, the weight of the counter being counter-balanced and a rail behind the rod 29 serving to hold the wheel lightly in mesh with the teeth of the drum. The motion of the endless grate 31 is transmitted to the drum 5 by means of bevel wheels 32, 33 and a flexible shaft 34, this latter being coupled to an extension 35 of the drum axle 5$^a$. The bevel wheel 32 is keyed upon the usual worm driving shaft 36 of the chain grate. The rod 29 is coupled to an extension 37, which latter, at the end outside the casing, is adjustably linked to one arm of the usual furnace door-raising lever 38. This same arm at its free end engages a nut 38$^a$ on the screwed spindle 39. The lever 38 is secured to the shaft 40, which passes through the hopper, and on the other side of the hopper is fitted with a lever arm, to which and the lever 38, by links 41, is connected the furnace door 3. By rotating the screw spindle 39, the door 3 is raised or lowered, while the counter is moved endwise to an extent proportional to the vertical movements of the door. Further, by regulating the height of the door the thickness of the fuel layer on the grate is regulated.

With the rotary movements of the drum 5 proportional to the velocity of the grate and the "curve" of the drum plotted to different heights of the furnace door, or areas of the opening, and also with the counter held in a position corresponding proportionately to the height of the door, or the thickness of the fuel layer on the grate, the instrument serves to automatically measure and indicate numerically the total quantity of cubic feet of fuel delivered into the furnace.

When the graphic record is also required, the chart drum 19 and roller 20 are arranged within the same casing and the drum 19 is driven at the same speed as the drum 5 through the medium of the endless chain 42 and pulleys 43. The pen carrying arm 18 is mounted upon the rod 29 and is thus moved endwise simultaneously and at the same rate as the counter 6.

As described in the said prior Patent No.

1,112,459 and shown in Fig. 7, the counter 6 may be stationary, and the movements of the toothed drum 5 be transmitted to the counter mechanism through a small pinion 16ª suitably shaped and arranged to mesh with the toothed drum 5, and a further and long pinion 16ᵇ, the axle of this latter carrying a worm 16ᶜ gearing with a worm wheel in the counter. The pinion 16ª will always be in mesh with the pinion 16ᵇ, and the rod 3ª, upon which the pinion 16ª is free to rotate while held against endwise movement by collars 16ᵈ, will be connected to the door 3, and thus, as the door is raised or lowered, will move the pinion 16ª to the required positions for measuring the material. The drum 5 will be rotated from the conveyer shaft through bevel wheels 7, 8 and 8ª and shafts 9 and 10 as shown.

While shown applied to a chain grate type of stoker, it will be readily understood that the invention may be applied to mechanical stokers of the shovel type, see Fig. 8. In this case the drum 5 will be rotated in sympathy with the intermittent forward movements of the "shovel" 44, and the adjustments for varying the stroke of the pusher or ram 45, by which latter the supply of fuel is regulated, will be used to move the counter to the required positions representing the effective sectional areas of the stream of fuel transmitted to the furnace. In the example shown the fulcrum of the ram operating lever 46 is supported by an adjustable bracket 47, and the lever is slotted, so that on raising or lowering the fulcrum, the stroke of the ram is varied. The counter (or rod 3ª) of the instrument is connected by a cord 48 working around pulleys 49, to the bracket 47, and thus, with the adjustments of the bracket, and under the pull of the weight 50, the counter (or pinion 16ª) is held in the correct position for the stroke of the ram, which multiplied by the width of the ram in plan represents the cross sectional area or thickness of the fuel delivered to the furnace.

What I claim is:—

1. In combination, a hopper for holding granular or powdered material and having an opening through which the material is delivered, a regulator for controlling such delivery, apparatus for moving the material forwardly as it is delivered from the hopper, a measuring instrument comprising integrating mechanism and a revolution counter, means whereby the said integrating mechanism is actuated in sympathy with the apparatus for moving the material forwardly, and further means whereby the said integrating mechanism is controlled in sympathy with the movements of the regulator, substantially as herein set forth.

2. In combination, a hopper for holding granular or powdered material, and having an opening through which the material is delivered, a regulator for controlling such delivery, an endless conveyer for moving the material forward as it is delivered from the hopper, a measuring instrument comprising integrating mechanism and a revolution counter, means for actuating the integrating mechanism in sympathy with the movements of the said conveyer, and further means whereby the integrating mechanism is controlled in sympathy with the movements of the regulator, substantially as herein set forth.

3. In combination, a hopper for holding granular or powdered material and having an opening through which the material is delivered, a regulator for controlling such delivery, an endless conveyer for moving the material forward as it is delivered from the hopper, an integrating measuring instrument comprising a rotary drum with teeth of varying length on a portion of its surface, a revolution counter and an intermediate counter-driving pinion for transmitting the motion of the drum to the counter and also for varying the integration, means for actuating the said drum in sympathy with the movements of the said conveyer, and means whereby the counter-driving pinion is moved endwise or laterally in sympathy with the movements of the regulator, substantially as herein set forth.

4. In combination, a hopper for holding granular or powdered material and having an opening through which the material is delivered, a regulator for controlling such delivery; an endless conveyer for moving the material forward as it is delivered from the hopper, an integrating measuring instrument comprising a rotary friction disk, a revolution counter, and a counter-driving pinion for transmitting the motion of the disk to the counter and also for varying the integration, means for actuating the disk in sympathy with the movements of the conveyer, and means whereby the counter-driving pinion is moved across the face of the disk in sympathy with the movements of the regulator, substantially as herein set forth.

5. In combination, a hopper for holding granular or powdered materials and having an opening through which the material is delivered, a regulator for controlling such delivery, apparatus for moving the material forwardly as it is delivered from the hopper, an integrating measuring instrument comprising a rotary drum with teeth of varying length on a portion of its surface, a revolution counter and an intermediate counter-driving pinion for transmitting the motion of the drum to the counter, two further drums, a length of chart paper passing from one drum to the other, a rod and pen slidably mounted in front of one of the chart paper carrying drums, and carrying the said counter driving pinion, means for actuating the said toothed integrating drum in sympathy with the movements of the said conveyer, means whereby the integrating mechanism is controlled in sympathy with the movements of the regulator, means whereby the chart paper carrying drums are rotated in sympathy with the toothed integrating drum, and means whereby the rod and pen are also moved in sympathy with the movements of the regulator, substantially as herein set forth.

6. In combination, a hopper for holding granular or powdered materials and having an opening through which the material is delivered, a regulator for controlling such delivery, apparatus for moving the material forwardly as it is delivered from the hopper, an integrating measuring instrument comprising a pair of rotary drums, a length of chart paper passing from one drum to the other, a rod and pen slidably mounted in front of the drums, and the pen bearing against the chart paper, means for actuating the said drums in sympathy with the movements of the conveyer; and means whereby the positions of the rod and pen are controlled in sympathy with the movements of the regulator, substantially as herein set forth.

In witness whereof I have hereunto set my hand in the presence of two witnesses.

JAMES EDWARD LEA.

Witnesses:
 F. C. PENNINGTON,
 WALTER LUNN.